United States Patent [19]

Sörgel et al.

[11] Patent Number: 5,255,434
[45] Date of Patent: Oct. 26, 1993

[54] PROCESS AND APPARATUS FOR THE CONTINUOUS PRODUCTION OF AN IRRIGATING TUBE

[75] Inventors: Fritz P. Sörgel; Karl Dietrich, both of Rain am Lech, Fed. Rep. of Germany

[73] Assignee: Drossbach GmbH & Co., Rain am Lech, Fed. Rep. of Germany

[21] Appl. No.: 778,883
[22] PCT Filed: Mar. 15, 1991
[86] PCT No.: PCT/DE91/00228
§ 371 Date: Jan. 10, 1992
§ 102(e) Date: Jan. 10, 1992
[87] PCT Pub. No.: WO91/14549
PCT Pub. Date: Oct. 3, 1991

[30] Foreign Application Priority Data

Mar. 21, 1990 [DE] Fed. Rep. of Germany ....... 4009061

[51] Int. Cl.[5] .................................................. B23P 15/00
[52] U.S. Cl. ................................... 29/890.14; 29/428; 138/43
[58] Field of Search ............... 29/890.14, 33 T, 33 K, 29/428; 239/542; 138/43, 114

[56] References Cited

U.S. PATENT DOCUMENTS

| | | | |
|---|---|---|---|
| 4,122,590 | 10/1978 | Spencer | 29/33 K |
| 4,817,875 | 4/1989 | Karmeli | 239/542 |
| 5,146,666 | 9/1992 | Babbitt | 29/33 K |

FOREIGN PATENT DOCUMENTS 1220737 3/1986 U.S.S.R. ............................ 29/33 T

*Primary Examiner*—Irene Cuda
*Attorney, Agent, or Firm*—Thomas M. Freiburger

[57] ABSTRACT

A process for the continuous production of an irrigating tube having trickling elements embedded between an inner tube and an outer tube; provides that, after extrusion of an inner tube and subsequent cooling of the tube, the latter is perforated at regular intervals to produce inlet orifices, that the tube is subsequently heated up again, at least in the region of the perforations, and that thereafter a trickling element is pressed into the surface of the inner tube in each case at the heated-up perforation points and is thereby connected to the inner tube. The inner tube and trickling elements are subsequently surrounded by an outer tube, in which outer outlet orifices are made at the points of the trickling elements.

9 Claims, 6 Drawing Sheets

PROCESS AND APPARATUS FOR THE CONTINUOUS PRODUCTION OF AN IRRIGATING TUBE

The invention relates to a process for the continuous production of an irrigating tube according to the preamble of claim 1 as well as an apparatus for carrying out this process according to claim 8.

For optimum plant growth, not only is it necessary to supply an adequate amount of light and heat, but also to let the plants have sufficient moisture. In regions in which the climatic conditions are generally dry, it is therefore customary to use irrigation systems for watering of the plants. Owing to the inherent disadvantages of these systems (evaporation, scorching of the plants in places), trickling irrigation systems have been developed which can deliver the desired moisture directly to the area around the roots of the plants.

These systems comprise tubes which are laid along the rows of plants and are provided at regular intervals with small orifices from which water can trickle, the said water having been fed into the tubes from a central water supply.

Such devices have been improved by special measures to the extent that the rate of delivery from the tubes can be set pressure-independently. For this purpose, U.S. patent specification 4,210,287, for example, provides for there to be arranged on the inside of a long tube, underneath the orifices, valve elements (trickling elements) which allow a uniform quantity of water per unit of time to pass through over a wide pressure range of the water fed through the tubes. Such trickling elements have a diaphragm, which constricts a meandering passage to a greater or lesser extent, depending on the water pressure.

The trickling elements known from this publication are welded to the inside of the tube. In order to improve the connection of the trickling elements to the tube, this citation provides for the tube to be thickened in the region of the trickling elements.

In the case of this type of connection of trickling elements and tube, none of the large number of trickling elements within a tube may become detached from the tube or have a leak in the connecting region between trickling element and tube, since otherwise considerable losses of water can occur. There is the risk of the trickling elements becoming detached from the wall of the tube, in particular when handling the tube and reeling-up.

U.S. Pat. No. 4,817,875 discloses another tube arrangement, in which similar trickling elements are inserted from outside into clearances of an inner tube, which has a perforation in the region of the trickling elements. Both trickling elements and inner tube are additionally surrounded by an outer tube, which likewise has a passage in the region of the trickling elements. The inserting of the trickling elements between an inner tube and an outer tube provides a greater safeguard against losses from leakage, since the trickling elements are fastened both with respect to the inner tube and with respect to the outer tube, so that there is a double safeguard against losses from leakage.

It has been found in practice that the method of production specified in this publication for inserting the trickling elements into clearances of the inner tube is not practicable.

Therefore, the underlying object of the invention is to provide a process and an apparatus for the continuous production of an irrigating tube of the type specified in U.S. Pat. No. 4,817,875 which permits a simple, cost-effective and high-quality production of such an irrigating tube.

This object is achieved by the invention specified in claim 1. Advantageous further developments of the invention are specified in subclaims.

According to the invention it is provided that, after extrusion of an inner tube and subsequent cooling of the tube, the latter is perforated at regular intervals to produce inlet orifices, that the tube is subsequently heated up again, at least in the region of the perforations, and that thereafter a trickling element is pressed into the surface of the inner tube in each case at the heated-up perforation point and is thereby connected to the inner tube. Inner tube and trickling elements are subsequently welded to an outer tube, in which finally outer outlet orifices are made at the points of the trickling elements.

An irrigating tube produced in such a way is able to hold the fitted trickling elements firmly and securely. Due to the welding of the trickling elements both onto the inner tube and onto the outer tube, a double safeguard against losses from leakage is ensured. The process according to the invention does not require any special forming of a depression in the inner tube, since this depression is produced by the trickling element itself when it is fitted onto the inner tube. Tolerance problems are consequently ruled out.

The perforation of the inner tube is preferably performed at the points at which the trickling elements are to be fitted, by means of a perforation punch running along at the speed of the tube. After the perforation, at least the perforation point is heated by means of a heat radiator or hot air, in a special configuration of the invention there being two heat sources provided, which take turns in heating up the perforation point. Both heat sources move over a predetermined path, preferably at the same speed as the inner tube. The perforation points can therefore be heated up right up to immediately ahead of the place where the trickling elements are to be fitted, to such an extent that a direct welding of the lower edge of the trickling elements to the inner tube can take place when the likewise preheated trickling elements are fitted. To increase the reliability of the welding, it may be envisaged that there is provided inside the inner tube an inner mandrel, which is of a flat design, corresponding to the plane of the edge of the trickling elements, in the region of the place at which the trickling elements are fitted onto the inner tube, in order in this way to generate a compressive force between the pressed-on trickling elements and the inner tube.

In order to avoid the inner tube moving away during its perforation, the inner mandrel may have in this region a clearance, into which the perforation punch can enter briefly after piercing the inner tube.

The fitting of the inner tube is preferably performed with the aid of a second crosshead and using a vacuum, in order to draw the outer tube well onto the inner tube with the trickling elements and weld it to said inner tube. Subsequently, the completed tube is drawn through a water bath and cooled. Finally, the forming of the outlet orifice in the outer tube is performed, in particular by drilling a hole over the trickling element.

The process according to the invention and the associated apparatus permit the production of an irrigating tube at speeds of up to over 30 m per minute. The tube produced is robust in handling and can also be used under harsh operating conditions.

The invention is explained in greater detail below with reference to an exemplary embodiment. In the drawing.

Figure 1:
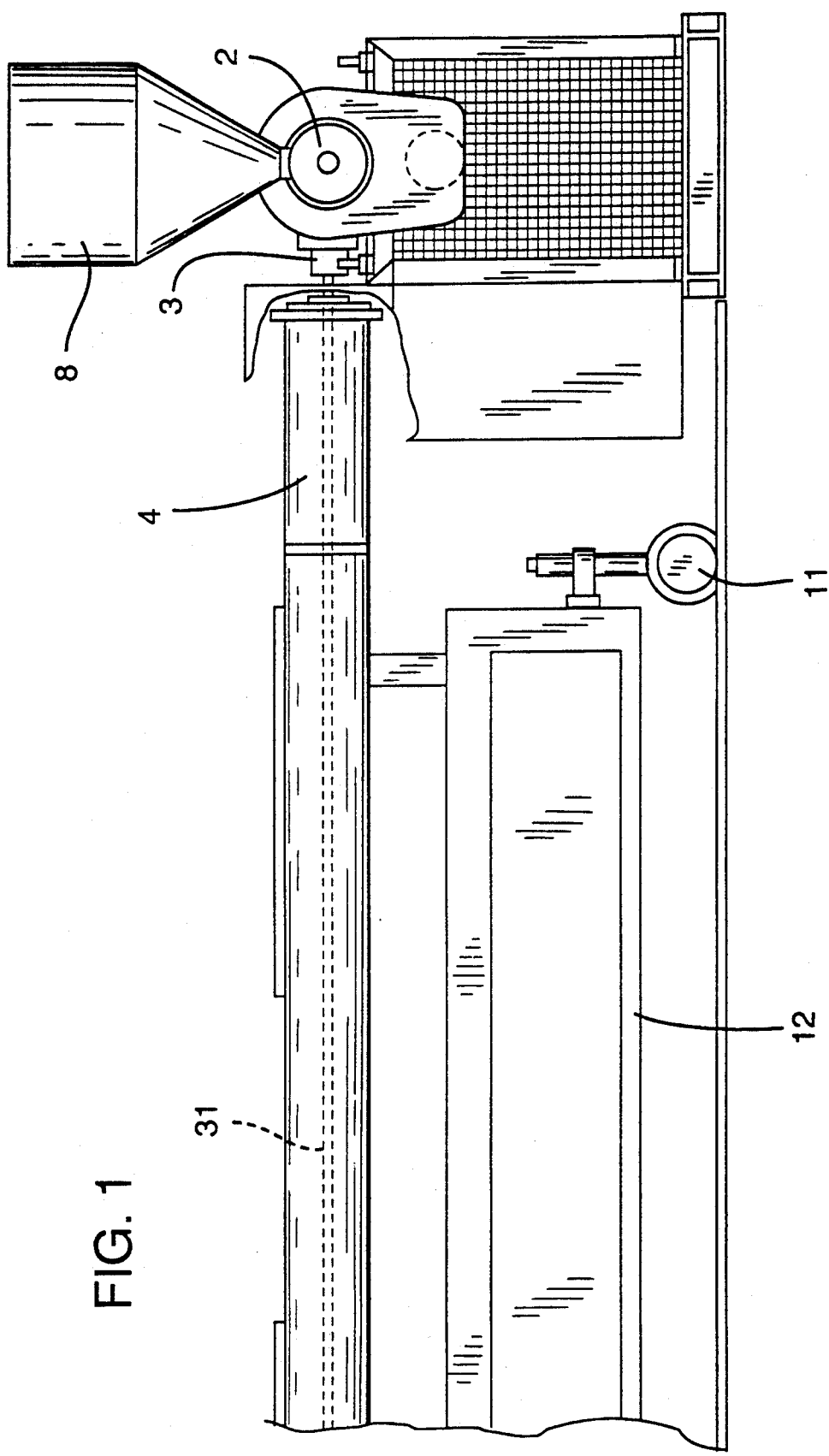
FIG. 1 shows the view of an extruder with downstream vacuum calibrating tank.
Figure 2:
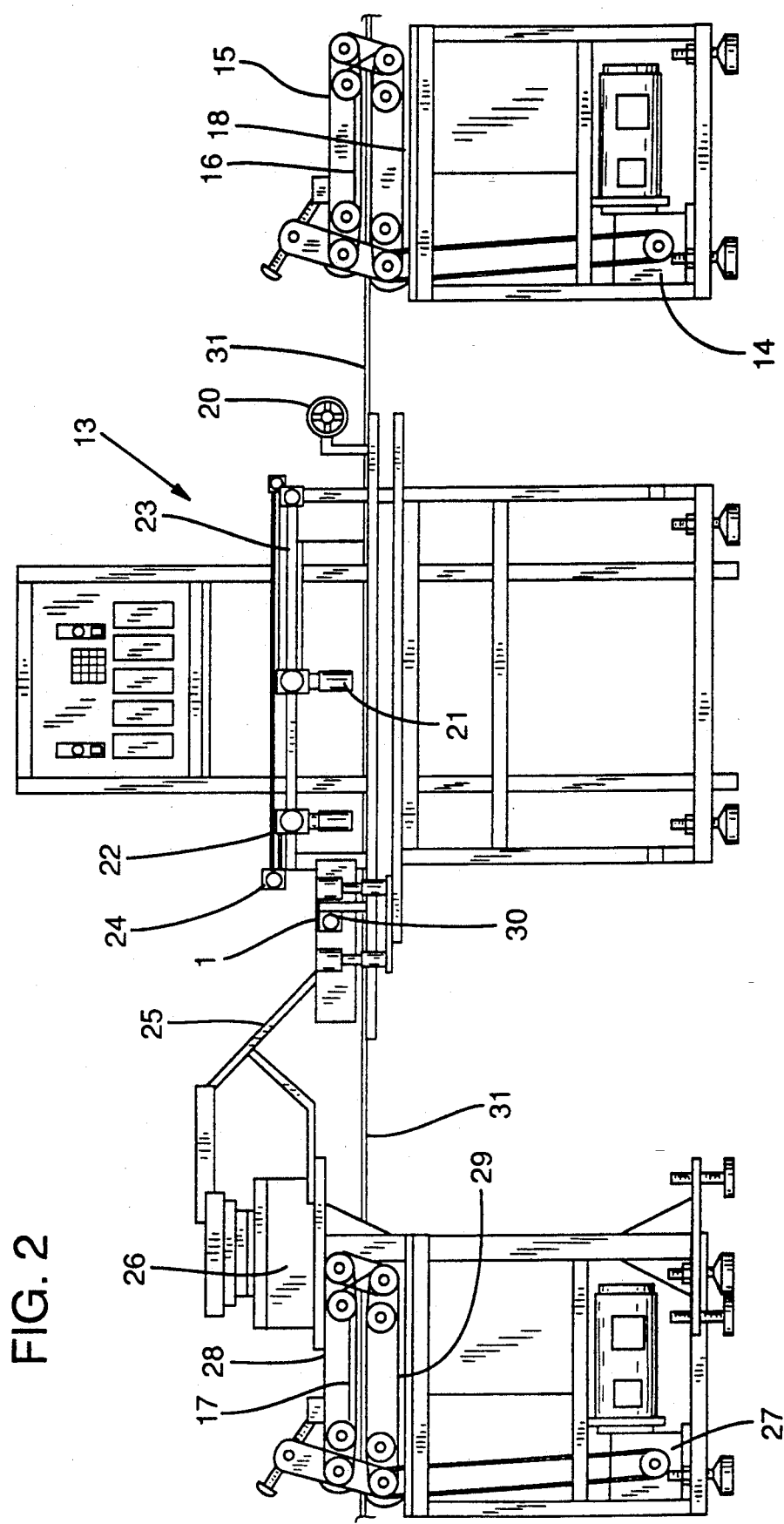
FIG. 2 shows a trickler push-in device and caterpillar take-offs.
Figure 3:
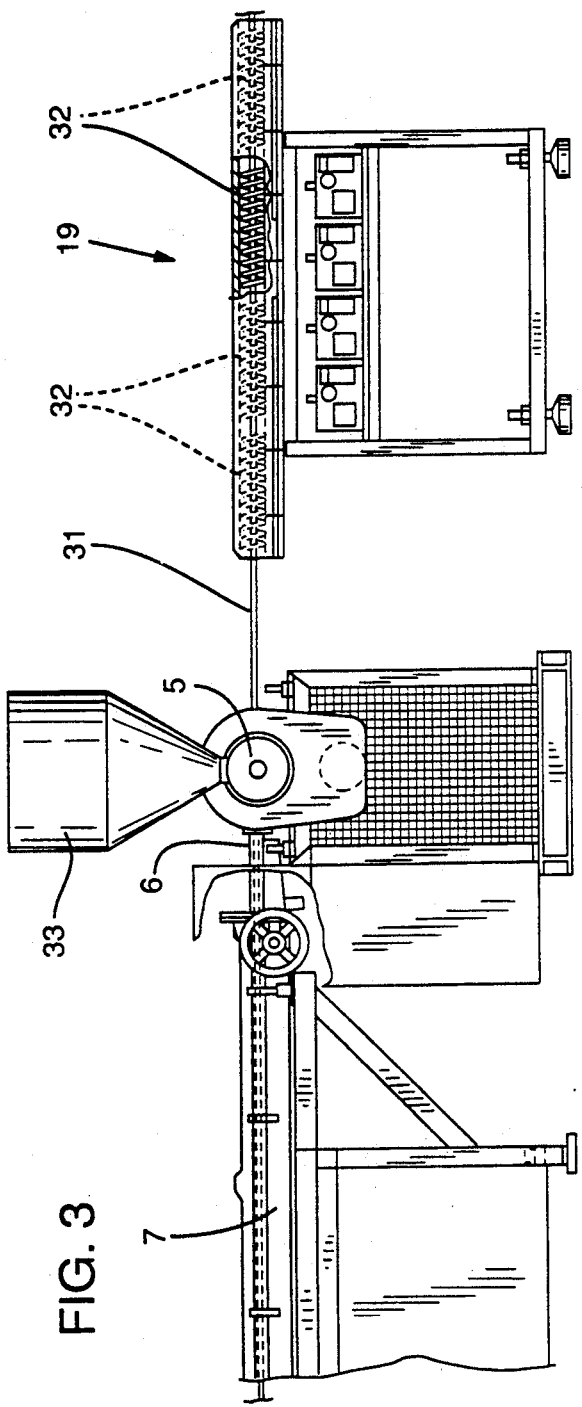
FIG. 3 shows a device for intermediate heating and a second extruder.
Figure 4:
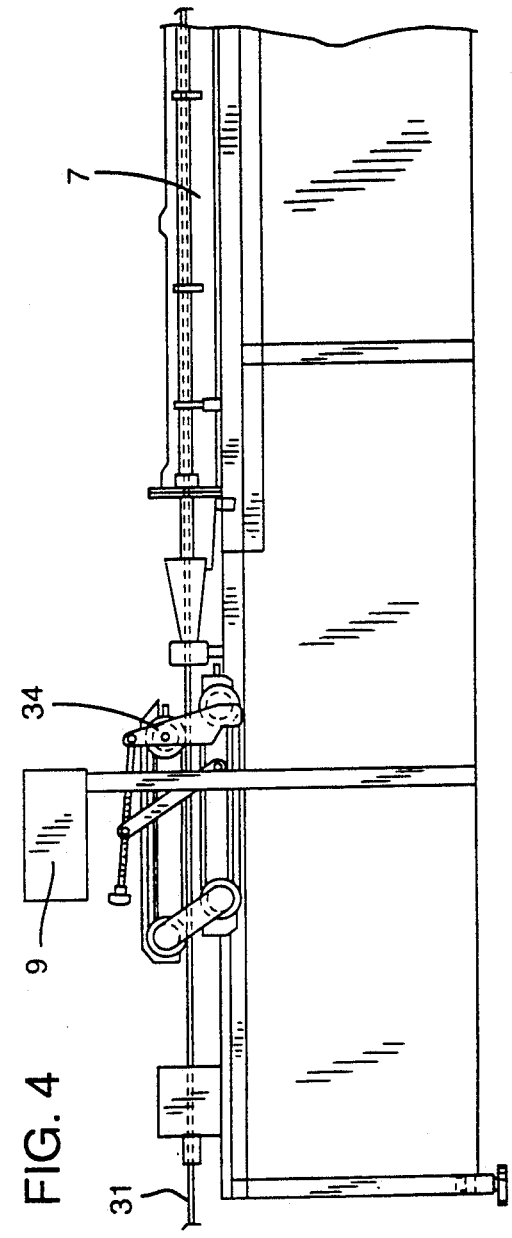
FIG. 4 shows a cooling station and a further caterpillar take-off.

An apparatus for the production of an irrigating tube according to the invention is shown in FIGS. 1–5. The part of the installation which is first in the process comprises a single-screw extruder 2, to which the tube material, in particular PE, is fed via a feed hopper 8. The extruder 2 leads to a cross head 3, which is followed by a vacuum calibrating tank 4. To initialise the extrusion, the calibrating tank 4, arranged on a framework 12, can be displaced laterally by means of rollers 11 and separated from the cross head 3.

Such an apparatus for the production of a smooth PE pipe is designed in a conventional way.

By the extrusion, a smooth, thin-walled PE pipe having a wall thickness of about 0.5 mm is produced. According to FIG. 2, the said pipe is drawn by a caterpillar take-off 16 and fed to the perforating and spot-heating device 13. The caterpillar take-off essentially comprises belts 15 and 18, driven in opposite directions by means of a drive 14. The caterpillar take-off 16 follows the vacuum calibrating tank 4.

The already cooled-down tube 31 is then fed to the perforating and spot-heating device 13. At the entrance to the treatment zone, there is a measuring roller 20, which detects the movement of the tube 31, in particular its speed. This is followed by the perforating device, which is not shown here. The perforating device has a lever arm, on the free end of which a needle is arranged, which can be guided at right angles to the tube by means of a parallel mechanism, during the entire movement of the lever arm. The lever arm movement is synchronised with the take-off speed of the tube, so that the needle, in the axial direction of the tube, can enter at right angles into the tube virtually without any relative movement between tube and needle. Even in the case of a great take-off speed of over 30 m per minute, in this way an exact perforation can be performed without the movement of the tube being interrupted. The perforation rate can be set and is derived from the measuring roller 20. The perforation intervals are, for example, 50 cm.

After the perforation station, the tube is heated up again in the region of the perforations. For this purpose, two heat sources 21 and 22 are provided, which are guided parallel to the tube along a guide rod 23. The movement of the heat sources is brought about by means of a drive 24. The speed of movement of the heat sources 21 and 22 is likewise derived from the measuring roller 20, so that the heating-up of the tube at the perforation points can be performed without relative movement between heat source and tube.

At the end of the path of movement of the first heat source 21, the second heat source 22 takes over the further heating-up of a perforation point, while during this time the heat source 21 moves back at an accelerated speed to the next perforation point and then heats this up along its path of movement. Due to the successive heating-up of the tube at the perforation points by two heat sources 21 and 22, a continuous heating-up over the entire path of movement of the heat sources is possible without any intermediate cooling of the tube taking place.

The heating up may be performed both by radiation heat and by hot air. Hot air is used with preference.

At the end of the heating-up zone there follows the trickler push-in device 1.

The trickle elements used are transferred from a stock bin via a vibrating conveyor device 26 and a feed channel 25 to the trickler push-in device 1. During this transfer, a position-detecting system ensures that the individual tricklers are fed in vertically correct alignment to the push-in device. The conveyance is preferably performed by means of a conveyor belt and an inclined plane. The trickler push-in device takes over the trickling elements in a magazine with pneumatic cross-transport which accurately positions the tricklers above the tube on a heating reflector. In this way, a preheating of the trickling elements is performed.

When a perforated, preheated point of the tube now runs past, the trickler is pushed by a push rod from the heating reflector over an inclined plane onto the tube, so that the trickling element sinks into the tube.

It is preferably provided that an inner mandrel, which is flattened off in a manner corresponding to the surface edge of the trickling element in the region where the trickling elements are to be fitted, is used inside the tube. This inner mandrel is held by the extruder head. By pressing the trickling elements onto the tube and by the counter-pressure generated by the inner mandrel, a particularly good welding of the edge of the trickling elements to the tube can be brought about.

The inner mandrel used also preferably has in the region of the perforating device a slot, into which the needle of the perforating device can enter during the perforation. As a result, the edge forming of the perforated hole can be improved, without the possibility that the resilience of the tube prevents the perforation.

The trickling elements are pressed into the tube to the extent that on the crown of the tube they then only project by about 0.5–1 mm. After the trickler push-in device, the tube 31 is drawn further by means of a caterpillar take-off 17 with two belts 28 and 29, moved in the same direction by means of a drive 27.

The cooling of the tube with the trickling elements which has been performed in the meantime prevents the trickling elements dropping off. After the take-off station 17, the entire tube is passed through a heating station 19, which has a plurality of heating coils 32. By this means, the inner tube is preheated to a temperature at which it can be introduced into the second extruder 5. The second extruder 5, shown in FIG. 5, likewise has a feed hopper 33 and a cross head 6. In this die head the outer tube is laid around the inner tube with the trickling elements, as it leaves the heating station 19. By means of a vacuum calibration, a particularly good heating-up of the outer sheath on the inner tube and a good moulding around the slightly projecting trickling elements is achieved. For this purpose, the cross head is sealed towards the rear, permitting the vacuum to be applied.

The cross head 6 is followed by a water bath 7, in which the finished double tube is cooled. A further caterpillar take-off 34 takes care of further transport. Following this, the outer tube is perforated centrally above the trickling element by a drilling device. A monitoring device 9 registers whether the hole has been drilled at the correct point and emits an error signal if too many or too few functional increments have been made.

Figure 5:
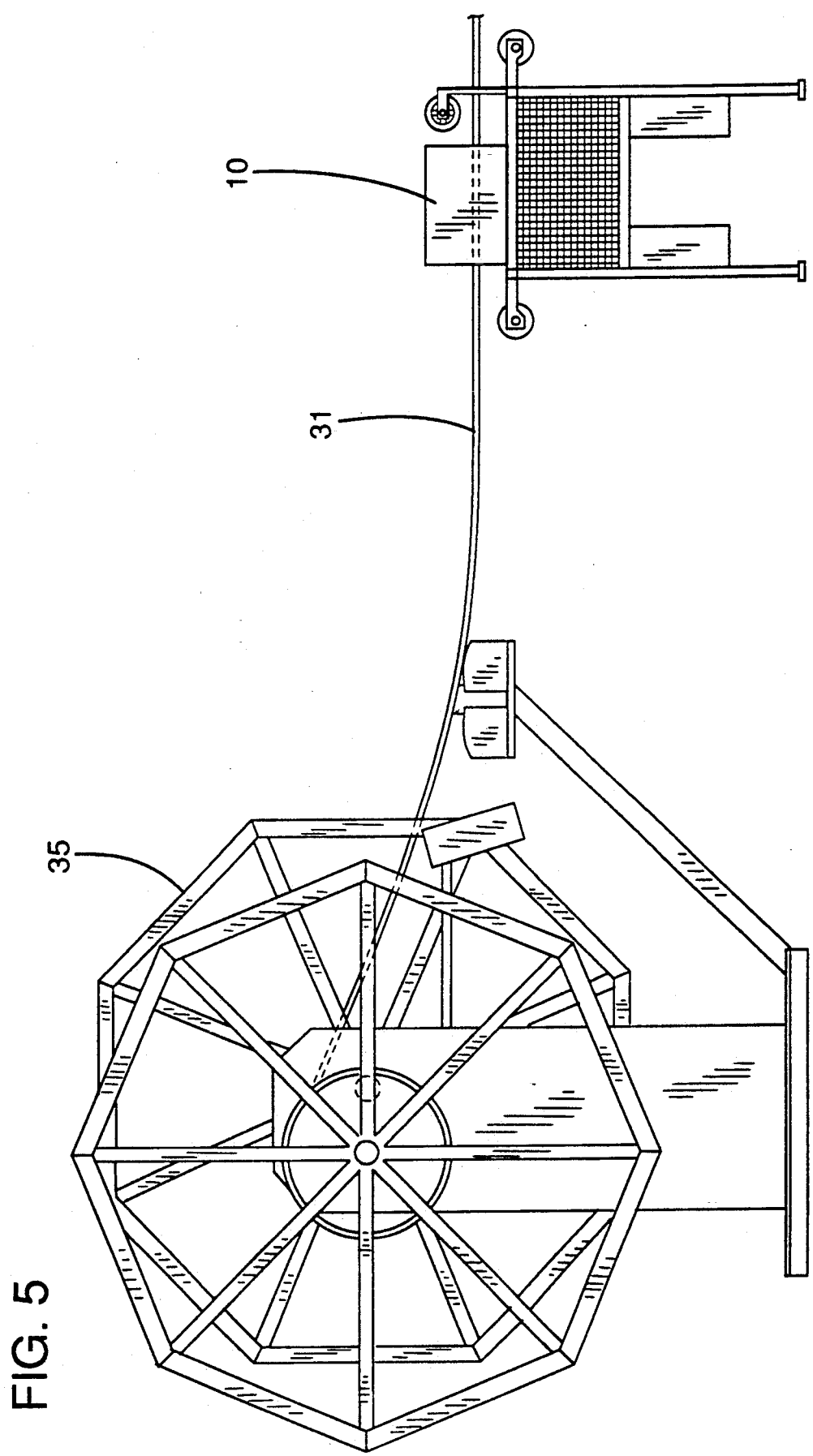
FIG. 5 shows a reel.

According to FIG. 5, a measuring and cutting device 10 cuts off the tube produced after a set length. A double reel 35 with layer winder winds the tube up.

All the process steps are preferably controlled and synchronised by means of a process computer. This process computer is freely programmable, so that the process can be easily adapted to changed requirements. This also permits extensive quality control of the fitting of the trickling elements into the inner tube as well as its sheathing by the outer tube.

Figure 6:
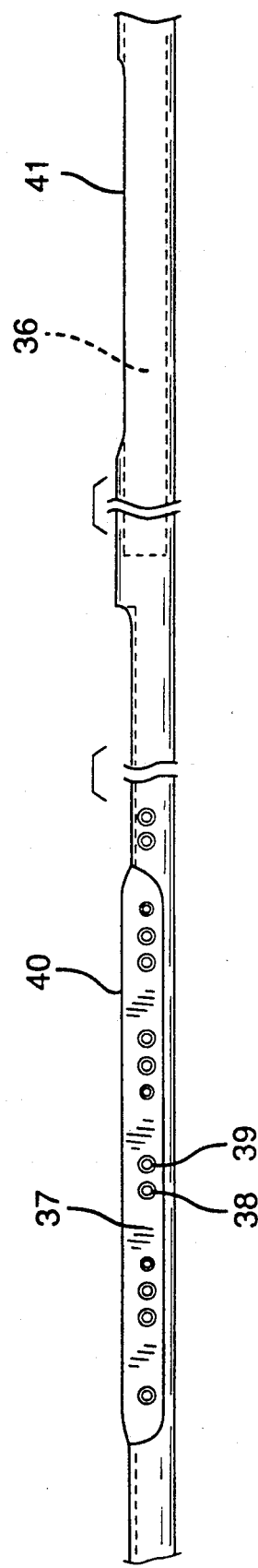
FIG. 6 shows a side view of an inner mandrel.

FIG. 6 shows an inner mandrel, which serves for supporting the inner tube during the fitting of the trickling elements onto the tube. The inner mandrel is held by the extruder head of the first extruder. On its upper side, the inner mandrel 36 has a flattened portion, over which the upper side of the tube with fitted trickling elements can slide. In the region where the trickling elements are fitted onto the inner tube, the mandrel 36 has lateral supporting plates 37, 43, of which the supporting plate 37 can be seen in FIG. 6. This supporting plate 37 has in the region where the trickling elements are fitted an elevated upper edge 40, which serves for the better moulding of the inner tube, as clearly shown in FIG. 8.

In the region where the trickling elements are fitted, the mandrel also has lateral thrust pieces 38 and 39, which are arranged in pairs, and which alternately press outwards towards one side and towards the other side of the mandrel. These thrust pieces are spring-mounted and bear against the inner tube.

Figure 7:
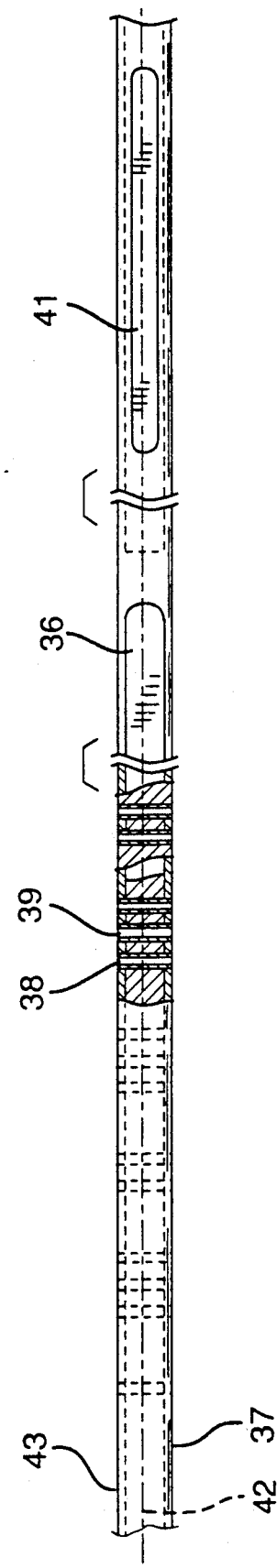
FIG. 7 shows a plan view of an inner mandrel.

FIG. 7 shows a mandrel from FIG. 6 in plan view. It is clearly shown that the thrust pieces 38 and 39 are laterally directed, transverse to the mandrel. The sliding path 42 begins shortly before the point at which the trickling elements are fitted onto the inner tube and runs up to the end of the mandrel.

At the point at which the perforation device punches a hole in the inner tube, the inner mandrel has a clearance 41, into which the needle of the perforation device can enter.

Figure 8:
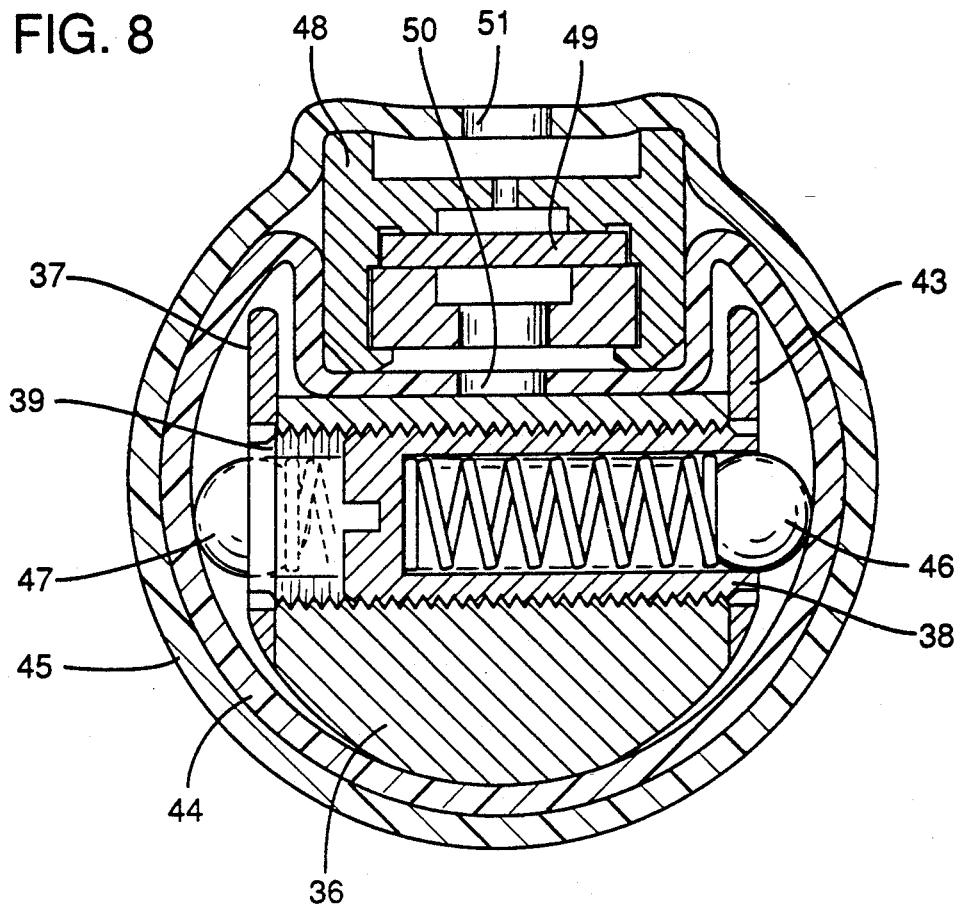
FIG. 8 shows a cross-section through an irrigating tube.

FIG. 8 shows the cross-sectional view of a finished tube piece in the region of a trickling element. The inner tube 44 is welded to the outer tube 45 over virtually the entire circumference. At the upper side of the tube there is a trickling element 48 between inner tube 44 and outer tube 45. The reference numeral 50 indicates the orifice of the inner tube, punched by the perforation device.

The outer tube likewise has an orifice, which is indicated by the reference numeral 51.

The trickling element is designed in a way known per se, and has in particular a diaphragm 49, which brings about a pressure regulation of the water running through the orifice 50, the trickling element 48 and the outer orifice 51.

To illustrate the manner of fitting the trickling element 48 onto the inner tube 44, the inner mandrel 36 has been drawn in in FIG. 8. When pressing the trickling element 48 onto the upper side of the inner tube 44, the inner tube 44 moulds itself around the supporting plates 37 and 43. However, the representation of FIG. 8 shows shortened supporting plates 37 and 43, which are provided outside the region where the trickling elements are fitted, in order to reduce the overall friction of the mandrel in the interior of the tube.

Also indicated are the thrust pieces 38 and 39, which have at their ends thrust balls 46 and 47, which press laterally against the inner tube. This arrangement is drawn in in FIG. 8 merely for the purpose of illustration, whereas it is actually located at a point on the inner mandrel at which no outer tube has yet been drawn onto the inner tube. The supporting plates 37 and 43 and the thrust pieces 38 and 39, together with the thrust balls 46 and 47, make it possible for the inner tube to come to bear particularly well against the trickling elements 48 and thus permit a welding over a large area of the inner tube 44 and the trickling element 48. This considerably increases the safeguard against losses from leakage.

Figure 9:
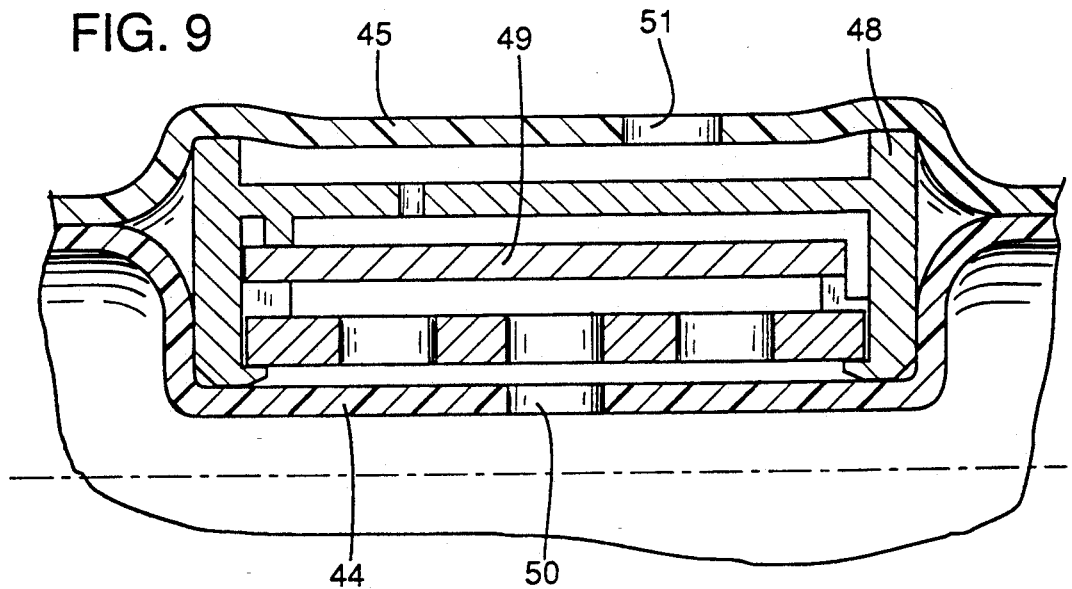
FIG. 9 shows a longitudinal section through an irrigating tube.

FIG. 9 shows a tube section in the region of a trickling element in a cross-sectional view. The trickling element 48 is welded on all edges to the inner tube 44 and the outer tube 45. The passage of the water from the tube to the outside takes place via the orifice 50, the interior of the trickling element 48 with the diaphragm 49, which serves for pressure regulation, and the outer orifice 51.

We claim:

1. A process for the continuous production of an irrigating tube having trickling elements embedded between an inner tube and an outer tube, comprising the steps of: after extrusion and subsequent cooling of the inner tube, perforating the inner tube at regular intervals in the axial direction, subsequently reheating the inner tube, at least in the region of the perforations, pressing trickling elements into the surface of the inner tube at the heated perforation points to connect the trickling elements to the inner tube, subsequently extruding an outer tube around the inner tube provided with the trickling elements, thereby welding the outer tube with the trickling elements, and then perforating the outer tube at the points of the trickling elements using a further perforation device.

2. A process according to claim 1, wherein the step of perforating the inner tube is accomplished using a punching tool, and moving the punching tool along with the tube for the perforation operation.

3. A process according to claim 1, wherein the reheating of the inner tube is accomplished by using a heat source and moving the heat source along with the tube at the perforation points.

4. A process according to claim 3, including using two heat sources to alternately heat the perforation points one after another, with the heat sources moving along at the speed of the inner tube during heating of the inner tube.

5. A process according to claim 1, including preheating the trickling elements before pressing them into the inner tube and thereby welding each trickling element to the inner tube over the perforation point.

6. A process according to claim 1, including heating the inner tube with inserted trickling elements before extrusion of the outer tube, and welding the inner tube and the outer tube over their full surface to each other and to edges of the trickling elements.

7. A process according to claim 1, further including, before the step of perforating the outer tube using the further perforation device, adjusting the irrigating tube about its longitudinal axis for positional control with respect to the further perforation device.

8. A process according to claim 1, wherein the step of pressing trickling elements into the surface of the inner tube comprises deforming the inner tube to form a depression shaped to receive the trickling element by the pressing of the trickling element into the heated surface of the tube.

9. A process according to claim 8, wherein, in connection with pressing of the trickling elements into the surface of inner tube, an inner mandrel is positioned inside the inner tube, positioned to be engaged by the inner surface of the inner tube during deforming of the tube when a trickling element is pressed into the heated surface of the inner tube.

* * * * *